United States Patent
Madany et al.

(10) Patent No.: US 7,107,308 B2
(45) Date of Patent: Sep. 12, 2006

(54) LOW COST, STATELESS, FULL-FEATURED INFORMATION APPLIANCE

(75) Inventors: Peter Madany, Fremont, CA (US); Eric Chu, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 709 days.

(21) Appl. No.: 09/727,969

(22) Filed: Nov. 30, 2000

(65) Prior Publication Data

US 2001/0032235 A1    Oct. 18, 2001

Related U.S. Application Data

(60) Provisional application No. 60/168,598, filed on Dec. 1, 1999.

(51) Int. Cl.
   *G06F 15/16* (2006.01)

(52) U.S. Cl. .............................. 709/203; 709/227

(58) Field of Classification Search ............... 709/228, 709/227, 229, 203; 713/151, 201; 370/360; 380/279

See application file for complete search history.

(56) References Cited

U.S. PATENT DOCUMENTS

| | | | | |
|---|---|---|---|---|
| 5,305,461 A | * | 4/1994 | Feigenbaum et al. | 712/225 |
| 5,809,140 A | * | 9/1998 | Rubin et al. | 380/279 |
| 5,961,601 A | * | 10/1999 | Iyengar | 709/229 |
| 6,035,404 A | * | 3/2000 | Zhao | 713/201 |
| 6,041,357 A | * | 3/2000 | Kunzelman et al. | 709/228 |
| 6,170,017 B1 | * | 1/2001 | Dias et al. | 709/235 |
| 6,205,124 B1 | * | 3/2001 | Hamdi | 370/260 |
| 6,226,750 B1 | * | 5/2001 | Trieger | 713/201 |
| 6,363,478 B1 | * | 3/2002 | Lambert et al. | 713/151 |
| 6,460,071 B1 | * | 10/2002 | Hoffman | 709/203 |
| 6,490,624 B1 | * | 12/2002 | Sampson et al. | 709/227 |
| 6,892,307 B1 | * | 5/2005 | Wood et al. | 713/201 |

OTHER PUBLICATIONS

Tseng, "What is Client-server Computing?", Jan. 19, 1998.*

* cited by examiner

*Primary Examiner*—John Follansbee
*Assistant Examiner*—Kenny Lin
(74) *Attorney, Agent, or Firm*—Martine Penilla & Gencarella, LLP

(57) ABSTRACT

In one of the many embodiments of the present inventions, a system is provided which includes at least one server to execute at least one session where the at least one session includes data associated with a user. The system also includes at least one stateless client coupled to the at least one server where the at least one stateless client obtains the at least one session from the at least one server.

20 Claims, 3 Drawing Sheets

LOW COST, STATELESS, FULL-FEATURED INFORMATION APPLIANCE

This application claims the benefit of U.S. Provisional Application No. 60/168,598, filed Dec. 1, 1999.

BACKGROUND OF THE INVENTION

1. Field of the Invention

This invention relates to the field of computer systems.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, the Sun logo, Java, JavaBeans, HotJava and all Java-based trademarks and logos are trademarks or registered trademarks of Sun Microsystems, Inc. in the United States and other countries.

2. Background Art

There is a desire to provide access to computer networks via simple computing devices. Currently the most effective way to access computer networks such as the internet is via personal computer (PC). Various manufacturers have attempted to provide a simplified computing device for network access, such as so called "network computers". Network computers and other such devices are referred to here as "information appliances". Another type of information appliance is the so called "web phone". The web phone is an attempt to provide a telephone for both voice and data transactions. In most incarnations, the webphone includes some form of voice transmitter and receiver, a numeric keypad, and an extended or dual purpose keypad for data entry, and a multi-line display.

Current information appliances implemented in the form of a so called web phone typically fit into one of two categories. One category is a low cost design with a very limited and fixed set of capabilities. Another category is a high cost design requiring large amounts of RAM, ROM, and CPU speed to achieve acceptable performance.

Problems with the low cost designs include a limited feature set and the inability to be dynamically updated or to download executable content from resources such as the internet. Problems with high cost design include the high cost (approximating that of a desktop PC) while lacking the performance of PCs. Also, when the devices have persistent data, that data must be explicitly synchronized if more than one device is used in a location, such as a home.

Another problem with prior art information appliances is the lack of effective scalability. Per unit cost is the same regardless of the number of units in the system.

SUMMARY OF THE INVENTION

The present invention provides a low cost information appliance that provides the ability to handle executable content from the internet and to have software capabilities upgraded. PC level performance and data synchronization are implicit to the design of the present invention. The invention decouples the processing, memory, and computing intensive activities from the display and data entry activities in a client/server model. The invention consists of a single server and one or more terminals connected by a wired or wireless network for data traffic. Voice is carried over existing telephone lines or over the same network that carries the data traffic. The server is connected to the phone network and internet over a wired network. The server is capable of running a multi-user OS such as Solaris or Linux. The server has processing power, disk storage, and memory capacity similar to a PC (e.g. 400 MHz 32 bit CPU, 64 MB RAM, 4 GB disk) and in one embodiment has an uninterruptable power supply. The clients (the appliance itself) include a network interface to communicate with the server. In one embodiment, the connection network is capable of simultaneous voice and data traffic. In another embodiment, the client also includes a POTS interface. The display is a low cost display such as a SVGA 800×600 256 color LCD or CRT. The client includes RAM, ROM and a simple video controller. In one embodiment, the clients include a simple keyboard, pointing device, and a CPU such as a 100 MHz uSPARC2ep. In one embodiment, the client also includes a SmartCard or mag-swipe interface.

DETAILED DESCRIPTION OF THE INVENTION

The invention is a method and apparatus for providing an information appliance. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

The present invention provides a decoupled processing and display environment for implementing information appliances. The invention provides computing and processing power in a server and display, voice, and data entry capabilities in one or more networked clients. In the present invention, economic scalability is required because the per unit cost of the system becomes lower with each additional client.

Figure 1:
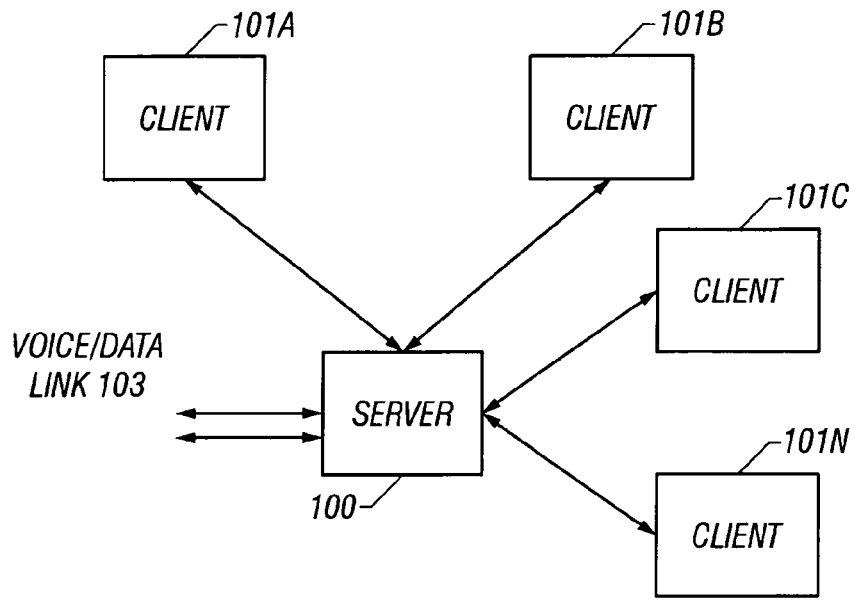
FIG. 1 illustrates a block diagram of the system of the present invention.

FIG. 1 is a block diagram illustrating one embodiment of the present invention. A Server 100 provides computational power and communications interface with voice and data through link 103. Link 103 can be a single link that provides access to both phone and data services or separate links for the same purpose. The server can be a hard wired or wireless connection to the phone network and the Internet and can be comprised of POTS, ISDN, or DSL, for example.

The server provides data to one or more clients 101A, 101B, 101C and up to 101N. The clients are not required to be capable of high speed processing since the server performs the processing for the clients. The clients receive display and voice data from the server and return voice and input data. The links between the clients and the server may be hard wired or wireless. Examples of a suitable connect network include telephone lines, IR repeaters, or RF transmitter/receiver connections.

Server Embodiment

Figure 2A:
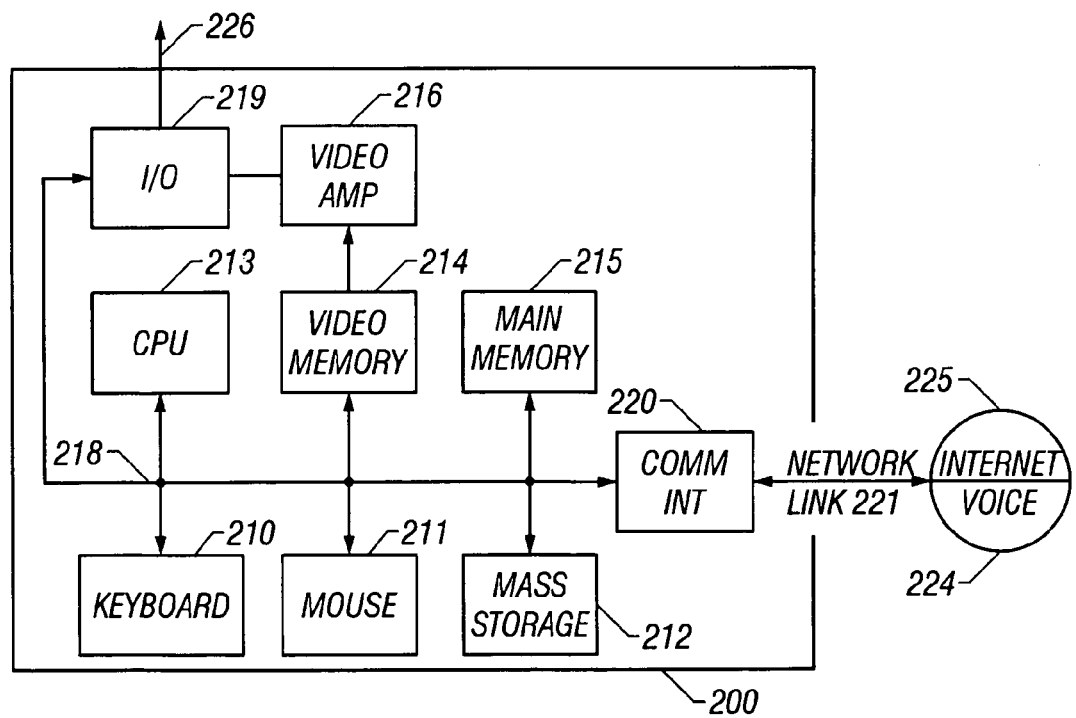
FIG. 2A illustrates an example of a server in one embodiment of the invention.

An embodiment of the server of the present invention can be implemented as a general purpose computer such as computer 200 illustrated in FIG. 2A, or in the form of bytecode class files running on such a computer. A keyboard 210 and mouse 211 are coupled to a bi-directional system bus 218. The keyboard and mouse are for introducing user input to the computer system and communicating that user input to processor 213. Other suitable input devices may be used in addition to, or in place of, the mouse 211 and keyboard 210. I/O (input/output) unit 219 coupled to bi-directional system bus 218 represents such I/O elements as a printer, A/V (audio/video) I/O, etc.

Computer 200 includes a video memory 214, main memory 215 and mass storage 212, all coupled to bi-directional system bus 218 along with keyboard 210, mouse 211 and processor 213. The mass storage 212 may include both fixed and removable media, such as magnetic, optical or magnetic optical storage systems or any other available mass storage technology. Bus 218 may contain, for example, thirty-two address lines for addressing video memory 214 or main memory 215. The system bus 218 also includes, for example, a 32-bit data bus for transferring data between and among the components, such as processor 213, main memory 215, video memory 214 and mass storage 212. Alternatively, multiplex data/address lines may be used instead of separate data and address lines.

In one embodiment of the invention, the processor 213 is a SPARC microprocessor from Sun Microsystems, Inc., a microprocessor manufactured by Motorola, such as the Power PC processor or a microprocessor manufactured by Intel, such as the 80×86, or Pentium processor. However, any other suitable microprocessor or microcomputer may be utilized. Main memory 215 is comprised of dynamic random access memory (DRAM). Video memory 214 is a dual-ported video random access memory. One port of the video memory 214 is coupled to video amplifier 216. The video amplifier 216 is used to provide display output to the clients via I/O 219. Video amplifier 216 is well known in the art and may be implemented by any suitable apparatus.

Computer 200 may also include a communication interface 220 coupled to bus 218. Communication interface 220 provides a two-way data communication coupling via a network link 221 to voice and/or data. For example, if communication interface 220 is an integrated services digital network (ISDN) card or a modem, communication interface 220 provides a data communication connection to the corresponding type of telephone line, which comprises part of network link 221. If communication interface 220 is a local area network (LAN) card, communication interface 220 provides a data communication connection via network link 221 to a compatible LAN. Wireless links are also possible. In any such implementation, communication interface 220 sends and receives electrical, electromagnetic or optical signals which carry digital data streams representing various types of information.

Network link 221 typically provides data communication through one or more networks to other data and/or voice networks. For example, network link 221 may provide a connection to a voice provider 224 such as a telephone company and/or to an internet source 225.

Computer 200 can send messages and receive data, including program code, through the network(s), network link 221, and communication interface 220. Computer 200 communicates with the one or more clients via communications link 226.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment. Another embodiment can be a server computer that does not include input devices or a display.

Client Embodiment

Figure 2B:
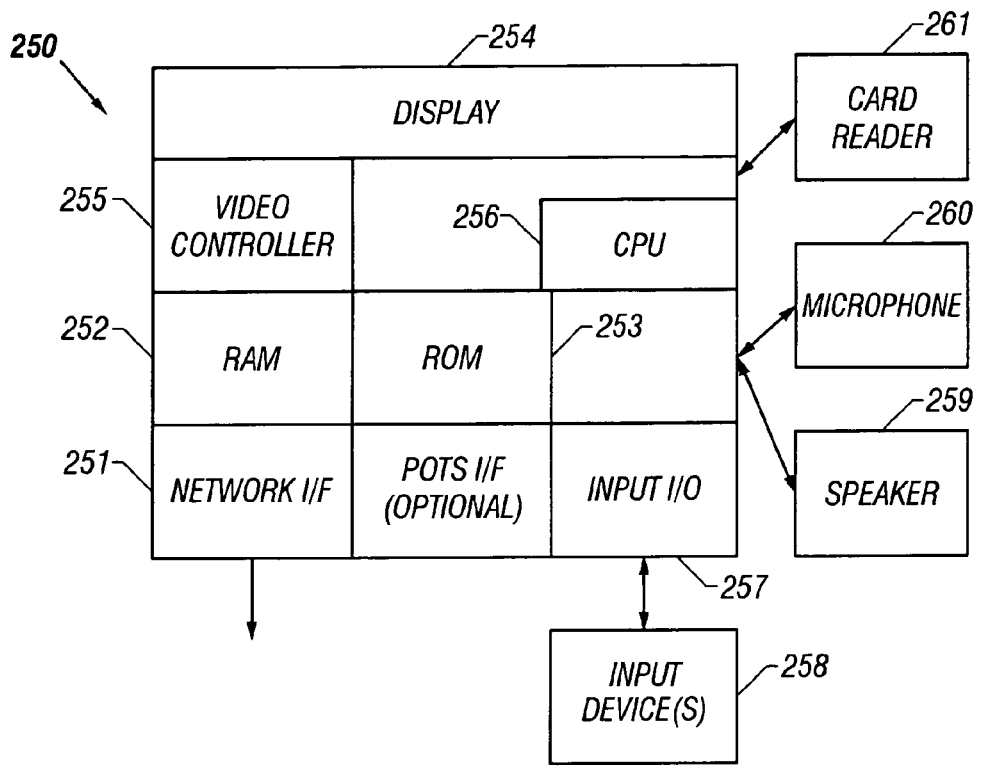
FIG. 2B illustrates an example of a client in one embodiment of the present invention.

FIG. 2B illustrates an embodiment of a client for use in the present invention. The client 250 includes a network interface 251 to communicate with the server 200. In one embodiment, the connection network is capable of simultaneous voice and data traffic. In another embodiment, the client also includes an optional POTS interface for separate voice and data traffic. The client includes RAM 252 (e.g. 4 MBytes) and firmware in ROM 253 (e.g. 512 Kbyte). Part of the RAM (256 kbytes to 1 Mbyte) could be used as video RAM. The client includes a simple display 254 such as a SVGA 800×600 256 color LCD or CRT. A simple video controller 255 receives display data from the server and provides it to the client display. Local processing is provided by CPU 256 which may be, for example, a 100 MHz uSPARC2ep.

The client also includes data entry devices such as a keyboard, number pad, and/or pointing device illustrated by input device(s) 258 which communicate with the client via input I/O 257. A speaker 259 and microphone 260 are included for voice communication.

In one embodiment, the client also includes a SmartCard or mag-swipe interface 261. The client of the present invention is a stateless device. State information is maintained on the server. In one scheme, state is maintained for one or more individual users. Each user can activate a client and access their state by using a smart card or magnetic card in the card reader at each client. The provision of services in the present invention revolves around an abstraction referred to here as a session. A session is a long-lived, persistent and reliable representation of those processes which are executing on behalf of a user at any point in time. A new session is created when a new user is enabled on the system. For each user that the system is aware of there are one or more sessions.

In the system of the invention, a user is not tied to any particular client. A user is associated with the user session, and the session can be displayed on any client that the user accesses. The client is typically in sleep, stand-by, or off mode when not in use. When a user wants to use a particular client, an authentication exchange takes place that may consist of one or more of a smartcard, key, password, and/or biometric mechanism.

When a user activates a client, the session's display is provided to the client display from the server. When the user departs from the client (e.g. by withdrawing a smartcard) the system stops the session display functions, and the client returns to its dormant state.

The present invention implements software applications such as Netscape 4.0 or above, PIM applications, telephony applications, administration applications, existing multi-user OS (ie Solaris, Linux) on server, DHCP support, and appropriate drivers. The client is effectively upgraded by upgrading software on the server.

System Embodiments

The present invention can take advantage of systems such as used in a virtual desktop system architecture such as described below.

Virtual Desktop System Architecture

One environment in which the present invention may be applied is in a virtual desktop system. One example of such a computer system is described in U.S. patent application Ser. No. 09/063,335 filed Apr. 20, 1998 and entitled "Method and Apparatus for Providing a Virtual Desktop System Architecture" and incorporated herein by reference. In such a system, there is provided a central office metaphor to computing, where features and functions are provided by one or more servers and communicated to an appliance terminal through a network. Data providers are defined as "services" and are provided by one or more processing resources. The services communicate to display terminals through a network, such as Ethernet. The terminals are configured to display data, and to send keyboard, cursor, audio, and video data through the network to the processing server. Functionality is partitioned so that databases, server and graphical user interface functions are provided by the services, and human interface functionality is provided by the terminal. Communication with the terminals from various services is accomplished by converting disparate output to a common protocol. Appropriate drivers are provided for each service to allow protocol conversion. Multiple terminals are coupled to the network. Users can enable their unique session at any one of the terminals by logging in such as by inserting a "smart card" into a card reader. Removing the card disables the session. Re-inserting the card into the same or any other terminal re-enables the session.

In the computer system described above, the interfaces for peripheral devices coupled to the human interface terminal appear over a network protocol and do not involve operating system device drivers in the traditional sense. Therefore, existing device driver software does not operate correctly.

Figure 3:
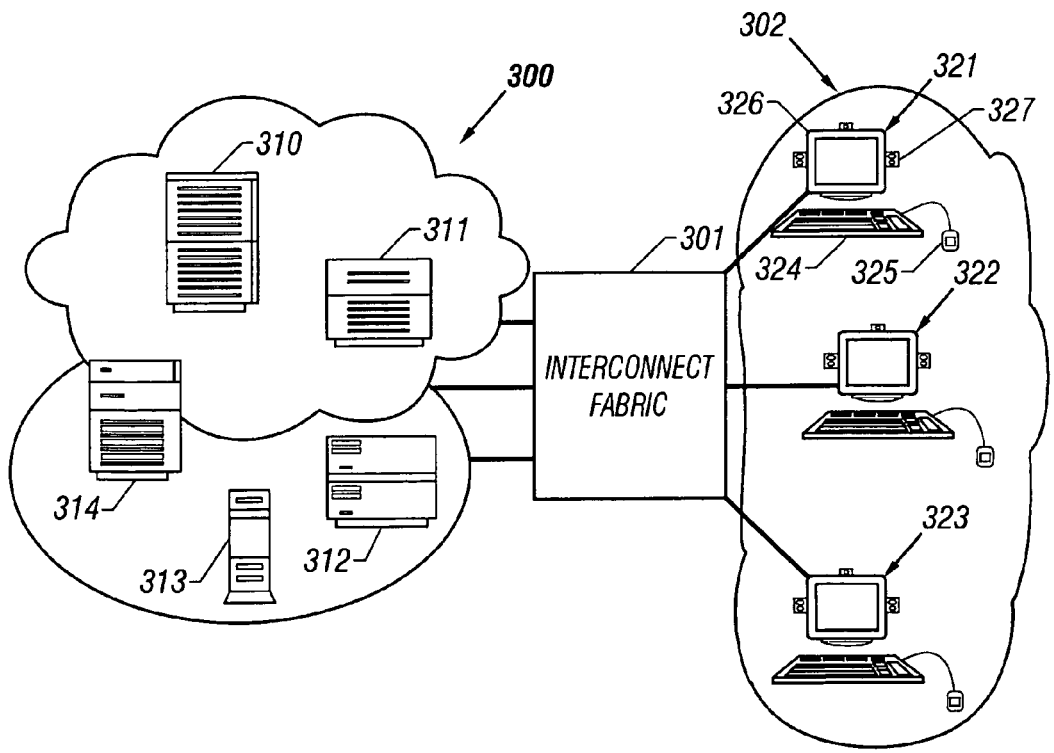
FIG. 3 illustrates the virtual desktop environment.

In this system the functionality of the system is partitioned between a display and input device, and data sources or services. The display and input device is a human interface device (HID). The partitioning of this system is such that state and computation functions have been removed from the HID and reside on data sources or services. In one embodiment of the invention, one or more services communicate with one or more HIDs through some interconnect fabric, such as a network. An example of such a system is illustrated in FIG. 3. Referring to FIG. 3, the system consists of computational service providers 300 communicating data through interconnect fabric 301 to HIDs 302.

Computational Service Providers

In the HID system, the computational power and state maintenance is found in the service providers, or services. The services are not tied to a specific computer, but may be distributed over one or more traditional desktop systems, or with traditional servers. One computer may have one or more services, or a service may be implemented by one or more computers. The service provides computation, state, and data to the HIDs and the service is under the control of a common authority or manager. In FIG. 3, the services are found on computers 310, 311, 312, 313, and 314. It is important to note that the central data source can also be providing data that comes from outside of the central data source, such as for example, the internet or world wide web. The data source could also be broadcast entities such as those that broadcast data such as television or radio signals.

Examples of services include X11/Unix services, archived or live audio or video services, Windows NT service, Java™ program execution service, and others. A service herein is a process that provides output data and responds to user requests and input.

It is the responsibility of the service to handle communications with the HID that is currently being used to access the given service. This involves taking the output from the computational service and converting it to a standard protocol for the HID. This data protocol conversion is handled in one embodiment of the invention by a middleware layer, such as the X11 server, the Microsoft Windows interface, a video format transcoder, the OpenGL interface, or a variant of the java.awt.graphics class) within the service producer machine. The service machine handles the translation to and from the virtual desktop architecture wire protocol.

In an embodiment of the invention, each service is provided by a computing device optimized for its performance. For example, an Enterprise class machine could be used to provide X11/Unix service, a Sun MediaCenter could be used to provide video service, a Hydra based NT machine could provide applet program execution service.

The service producing computer systems connect directly to the HIDs through the interconnect fabric. It is also possible for the service producer to be a proxy for another device providing the computational service, such as a database computer in a three tiered architecture, where the proxy computer might only generate queries and execute user interface code.

Interconnection Fabric

In the invention, the interconnection fabric is any of multiple suitable communication paths for carrying data between the services and the HIDs. In one embodiment the interconnect fabric is a local area network implemented as an Ethernet network. Any other local network may also be utilized. The invention also contemplates the use of wide area networks, the internet, the world wide web, and others. The interconnect fabric may be implemented with a physical medium such as a wire or fiber optic cable, or it may be implemented in a wireless environment.

In one embodiment of the invention, the interconnect fabric provides actively managed, low-latency, high-bandwidth communications between the HID and the services being accessed. One embodiment contemplates a single-level, switched network, with cooperative (as opposed to competing) network traffic. Dedicated or shared communications interconnects may be used in the present invention.

Human Interface Devices

The HID is the means by which users access the computational services provided by the services. FIG. 3 illustrates HIDs 321, 322, and 323. A HID consists of a display 326, a keyboard 324, mouse 325, and audio speakers 327. The HID includes the electronics need to interface these devices to the interconnection fabric and to transmit to and receive data from the services.

Figure 4:
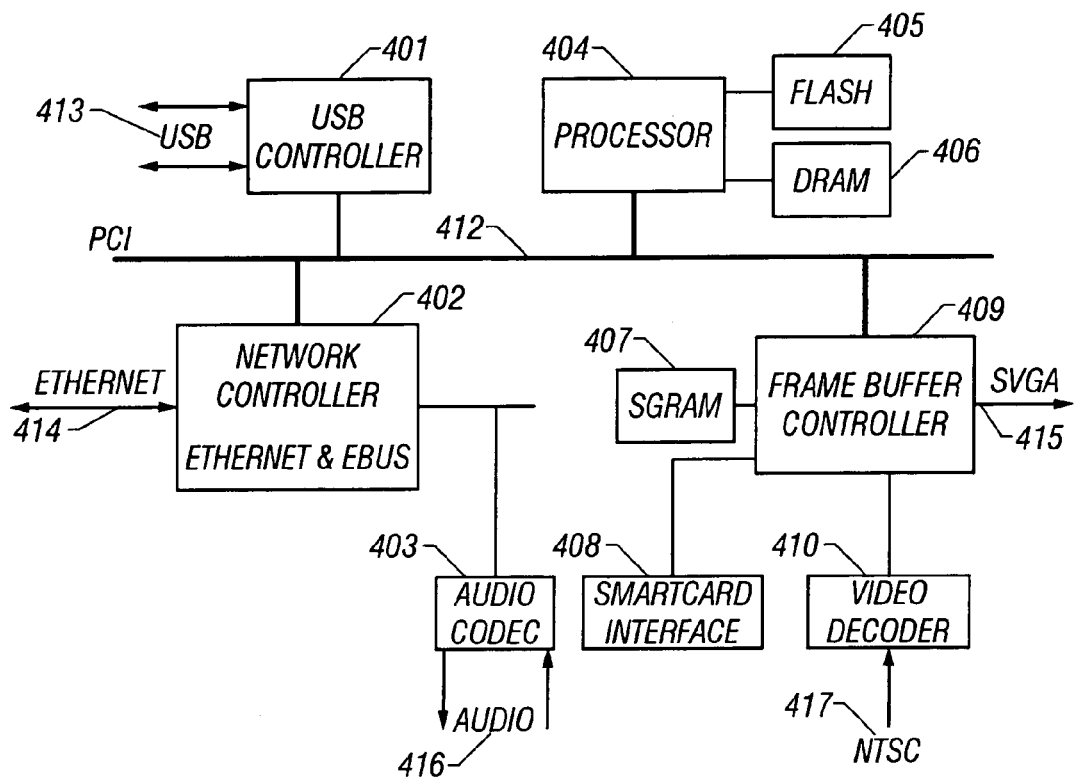
FIG. 4 is a block diagram of one embodiment of an HID.

A block diagram of the HID is illustrated in FIG. 4. The components of the HID are coupled internally to a PCI bus 412. A network control block 402 communicates to the interconnect fabric, such as an ethernet, through line 414. An audio codec 403 receives audio data on interface 416 and is coupled to block 402. USB data communication is provided on lines 413 to USB controller 401.

An embedded processor 404 may be, for example, a Sparc2ep with coupled flash memory 405 and DRAM 406. The USB controller 401, network controller 402 and embedded processor 404 are all coupled to the PCI bus 412. Also coupled to the PCI 412 is the video controller 409. The video controller 409 may be for example, and ATI Rage 128 frame buffer controller (or any other suitable controller) that provides SVGA output on line 415. NTSC or PAL data is provided into the video controller through video decoder 410. A smartcard interface 408 may also be coupled to the video controller 409.

Figure 5:
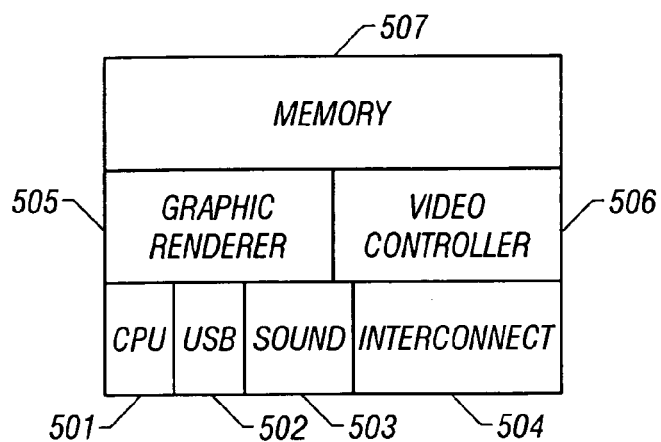
FIG. 5 illustrates a single chip HID embodiment.

Alternatively, the HID can be implemented using a single chip solution as illustrated in FIG. 5. The single chip solution includes the necessary processing capability implemented via CPU 501 and graphics renderer 505. Chip memory 507 is provided, along with video controller/interface 506. A universal serial bus (USB) controller 502 is provided to permit communication to a mouse, keyboard and other local devices attached to the HID. A sound controller 503 and interconnect interface 504 are also provided. The video interface shares memory 507 with the CPU 501 and graphics renderer 505. The software used in this embodiment may reside locally in non volatile memory or it can be loaded through the interconnection interface when the device is powered.

Thus, a method and apparatus for providing an information appliance has been described.

The invention claimed is:

1. A system comprising:
   at least one server configured to execute at least one session, said at least one session comprising data associated with a user;
   at least one stateless client coupled to said at least one server, wherein said at least one stateless client obtains said at least one session from said at least one server, wherein said at least one server maintains at least one state and said at least one state is associated with said at least one session, and further comprising at least one second stateless client, wherein said second stateless client connects to the same said session as said at least one stateless client was connected to, so as to allow the second stateless client access to the at least one state, and wherein said at least one server continues to execute said session when said at least one stateless client disconnects from said at least one server.

2. The system of claim 1 wherein said at least one server uses said at least one state to determine said session data to transmit to said at least one stateless client.

3. The system of claim 2 wherein said at least one client further comprises at least one user identification input for providing identification of said at least one user to said at least one server.

4. The system of claim 3 wherein said session comprises graphical data displayed to said at least one user at said at least one stateless client.

5. The system of claim 3 wherein said session data comprises voice data.

6. The system of claim 3 wherein said sessions associated with said state corresponding to said user comprise sessions accessed by said user from any of said at least one stateless clients from which said user's identification is provided to said at least one server.

7. The system of claim 1 wherein said coupling between said at least one server and said at least one stateless client comprises a network.

8. The system of claim 7 wherein said network further comprises two directional data communications comprising simultaneous voice and data traffic between said at least one server and said at least one at least one stateless client.

9. A method for providing data to a stateless client comprising:
   obtaining user identification information;
   providing said user identification information to a server;
   initiating a persistent session at said server, wherein said persistent session is associated with said user;
   associating at least one state with said session on said server;
   maintaining said at least one state on said server;
   providing data associated with said session to said user at a first stateless client computer;
   providing said data associated with said session to said user at a second stateless client computer, so allowing said second stateless client computer access to said at least one state;
   continuing execution of said session when neither said first stateless client computer or said second stateless client computer is being provided data associated with said session; and continuing execution of said session when either said first stateless client or said second stateless client computer disconnects from said server.

10. The method of claim 9 wherein said user identification comprises a unique identifier associated with said user.

11. The method of claim 10 wherein said unique identifier resides on a smart card.

12. The method of claim 11 wherein said providing data associated with said session further comprises displaying graphical data to said user.

13. The method of claim 10 wherein said session on said server comprises a plurality of processes executing on behalf of said user.

14. The method of claim 9 wherein said data associated with said session comprises two directional data communications comprising simultaneous voice and data traffic between said server and said clients.

15. A computer program product comprising:
   a computer readable storage medium having a computer readable program stored therein, said computer readable program configured to:
   obtain user identification information;
   provide said user identification information to a server;
   initiate a persistent session at said server, wherein said persistent session is associated with said user;
   associate at least one state with said session on said server;
   maintain said at least one state on said server;
   provide data associated with said session to said user at a first stateless client computer;
   provide said data associated with said session to said user at a second stateless client computer, so allowing said second stateless client computer access to said at least one state;
   said computer readable program configured to continue execution of said session while neither said first stateless client computer or said second stateless client computer is being provided data associated with said session; and
   said computer readable program configured to continue execution of said session at said server when either said first stateless client or said second stateless client computer disconnects from said server.

16. The computer program product of claim 15 wherein said user identification comprises a unique identifier associated with said user.

17. The computer program product of claim 16 wherein said unique identifier resides on a smart card.

18. The computer program product of claim 15 wherein said providing data associated with said session further comprises displaying graphical data to said user.

19. The computer program product of claim 15 wherein said session on said server comprises a plurality of processes executing on behalf of said user.

20. The computer program product of claim 15 wherein said data associated with said session comprises two directional data communications comprising simultaneous voice and data traffic between said server and said first stateless client computer or said second stateless client computer.

* * * * *